Dec. 26, 1967  F. R. MEYERCHICK, JR  3,359,771
BENCH BRAKE
Filed July 1, 1965  3 Sheets-Sheet 1
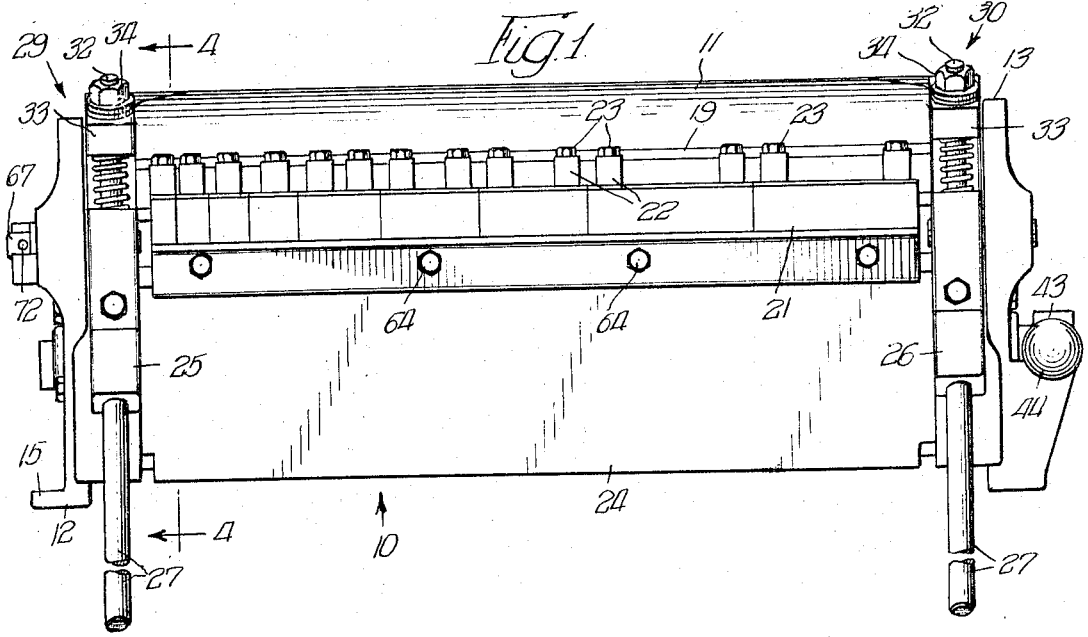
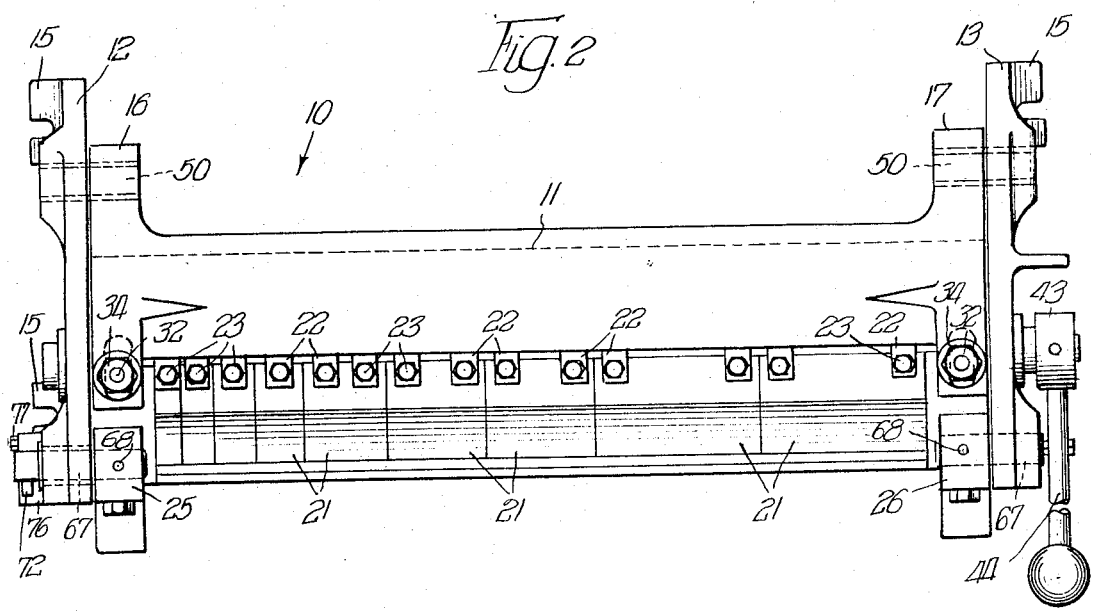
Inventor:
Frank R. Meyerchick, Jr.
Hurst, Lockwood, Dunnawalt & Dewry
attys

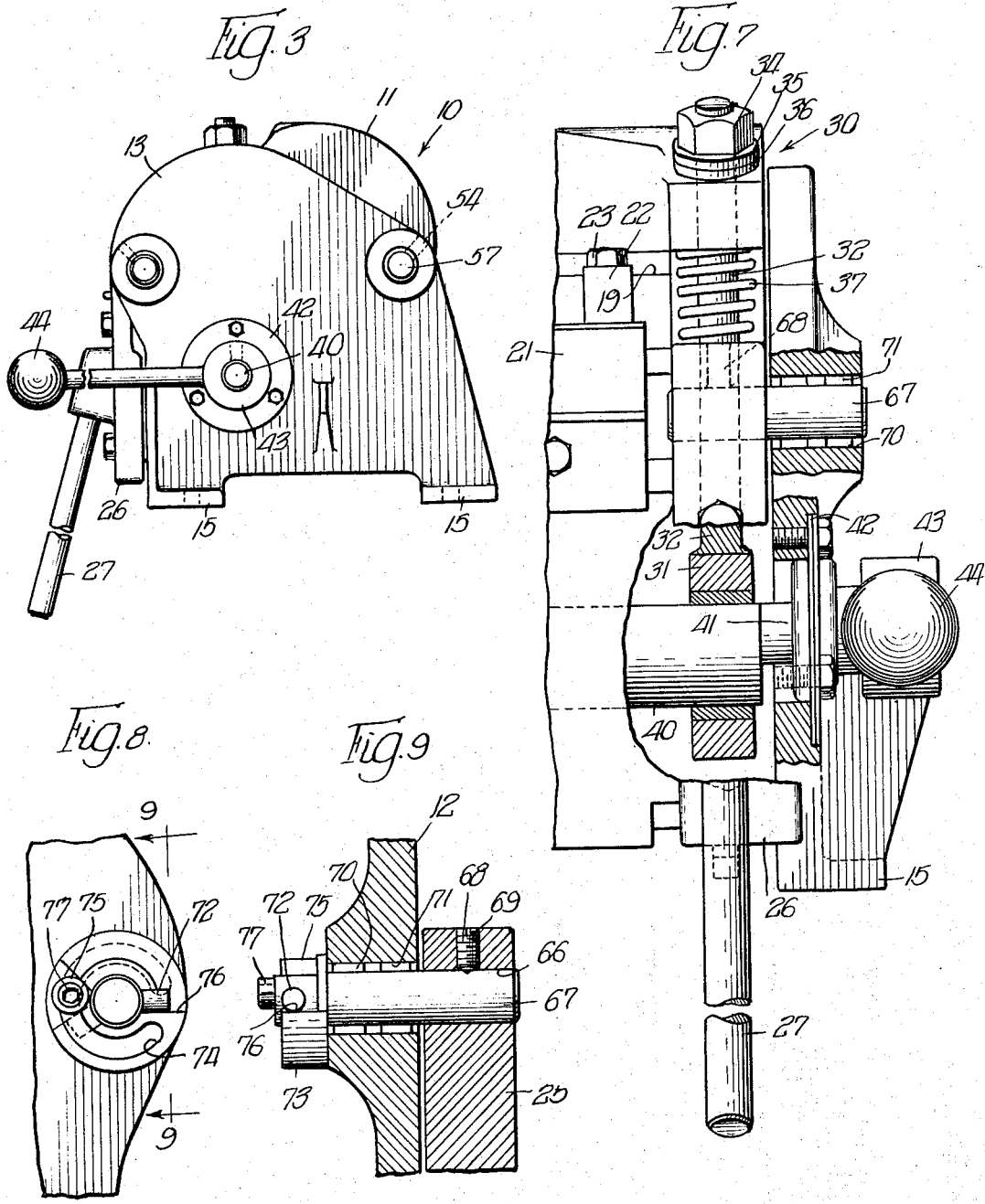

Dec. 26, 1967 F. R. MEYERCHICK, JR 3,359,771
BENCH BRAKE
Filed July 1, 1965 3 Sheets-Sheet 3

Inventor
Frank R. Meyerchick, jr.

United States Patent Office 3,359,771
Patented Dec. 26, 1967

3,359,771
BENCH BRAKE
Frank R. Meyerchick, Jr., Dolton, Ill., assignor to Dreis & Krump Manufacturing Co., Chicago, Ill., a corporation of Illinois
Filed July 1, 1965, Ser. No. 468,772
7 Claims. (Cl. 72—319)

ABSTRACT OF THE DISCLOSURE

A bench brake for use in light capacity sheet metal work and having a cast top leaf supported by eccentrically mounted hinge pins rotatable to permit adjustment for different metal thicknesses. An easily adjusted stop gauge permits adjustment of the bend angle. A continuous clamp shaft permits operation of the clamping leaf by one hand for greater accuracy in bending.

---

This invention relates to improvements in brakes in general and more specifically is directed towards improvements in that class of brakes known as bench brakes.

Light capacity or bench brakes have many applications in small job shops and home workshops. The ability of the same to be transported and readily set up for operation has made them exceedingly popular in the production of ducts and fittings in known types of cooling, heating and ventilating systems.

In the present bench brake, the top leaf is formed by casting to provide a more rigid structure and obtain greater accuracy in clamping. Eccentrically mounted hinge pins support the top leaf assembly for angular movement and permit forward and rearward adjustments by merely rotating the hinge pin to compensate for various thicknesses of sheet metal stock to be bent.

An eccentrically mounted operating shaft permits the top leaf to be raised and lowered into clamping engagement with the anvil assembly by operation of a single clamping handle and the clamping pressure can be adjusted to compensate for variation in thickness. Repeatability of bends and adjustment of any desired angle of bend is possible through a novel stop gauge mounted on one of the shafts supporting the bending leaf. The stop gauge is of simple design yet very effective to permit accurate bending to the chosen angle of bend and to preclude overbending.

The bench brake of the present invention is of uncomplicated design having cast end support members supporting a top leaf which as pointed out above is also formed by casting. The bending leaf is formed of flat metal plate and provided with a bolted hinge arrangement which permits the hinge pins and handles to be easily assembled. The brake is of exceedingly simple construction which permits the same to be manufactured at a reduced cost without detracting from its rugged qualities. A better understanding of the salient features of the bench brake of the present invention may be had by reference to the objects achieved and a consideration of the detailed description of the device.

It is an object of this invention to provide a new and improved bench brake.

It is a further object of this invention to provide a new and improved bench brake of uncomplicated design having a novel top leaf construction and means to mount the same whereby the top leaf may be readily adjusted to compensate for different thicknesses in metal stock.

It is a further object of this invention to provide a novel means for connecting the clamping links to the top leaf thereby to provide uniform clamping action.

It is a further object of this invention to provide a new and improved bench brake of uncomplicated construction having a novel clamping mechanism.

It is a further object of this invention to provide a bench brake having a new and improved means for mounting the bending leaf including a novel stop gauge means to permit setting of any desired angle of bend and further insuring repeatability of the selected bend angle.

Further and fuller obects of this invention will become readily apparent when reference is made to the accompanying drawings wherein:

FIG. 1 is a front elevational view of the brake of the present invention;

FIG. 2 is a top plan view of the brake of FIG. 1;

FIG. 3 is an elevational view of the right-hand end of the brake shown in FIGS. 1 and 2;

FIG. 7 is an enlarged fragmentary front elevational view of the right-hand end of the brake of FIG. 1 with parts broken away to show the details of the operating arrangement;

FIG. 8 is an enlarged elevational view of the stop gauge; and

FIG. 9 is a cross sectional view with the shaft and stop gauge in full lines taken generally along the lines 9—9 of FIG. 8.

Figure 4:
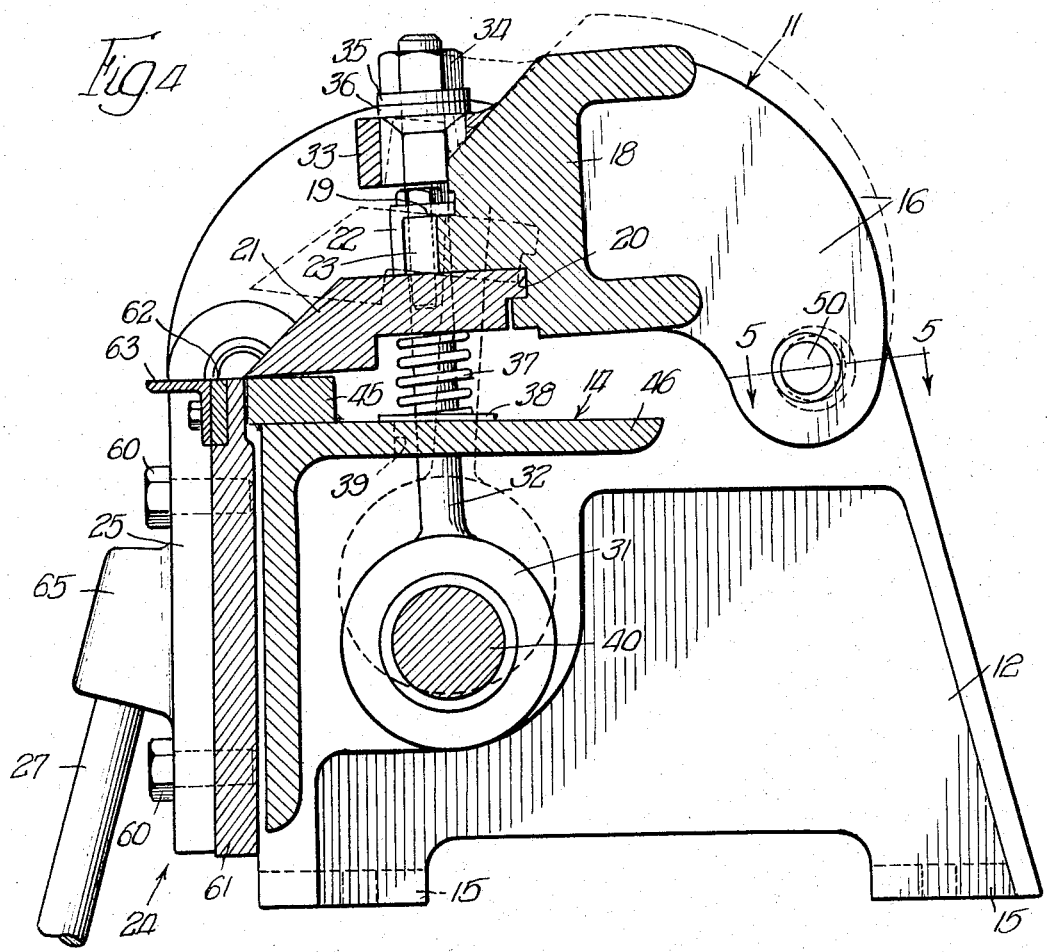
FIG. 4 is an enlarged cross sectional view taken along the lines 4—4 of FIG. 1.

Referring now to FIGS. 1–4, a bench brake is indicated generally by the reference numeral 10 and includes the usual top leaf assembly 11 disposed between end supports 12 and 13 which end supports also mount the anvil assembly 14. Each of the end support members 12 and 13 may be formed by casting if desired, and will include the usual feet portion 15 which facilitates attachment to leg members, a stand, and the top of a work bench or the like.

The top leaf assembly 11 is provided with hinge arm portions 16 and 17 formed integral with the top leaf 11 at the time of casting and joined to the end supports 12 and 13. The cross sectional configuration of the top leaf shown in FIG. 4 reveals a central body 18 of generally U-shaped configuration with the base of the U formed to include a machined upper attachment shoulder 19 and longitudinally extending finger mounting groove 20 which mounts individual clamping fingers 21 by means of an L-shaped clamp member 22 held in place by a threaded bolt 23 received in a threaded recess in the finger 21.

Figure 5:
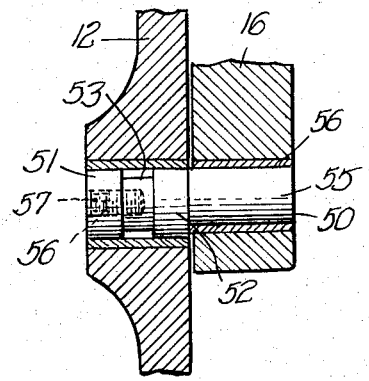
FIG. 5 is an enlarged fragmentary view of the hinge mounting arrangement for the top leaf assembly.
Figure 6:
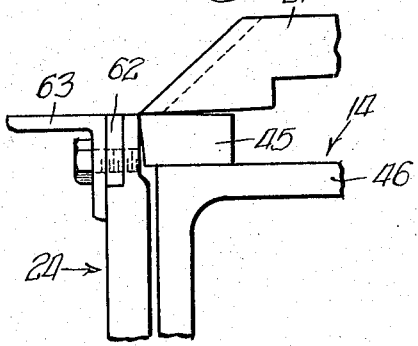
FIG. 6 is an enlarged view at the junction of the bending leaf, anvil, and clamping fingers.

Each of the hinge portions 16 and 17 is provided with hinge pin means rotatably carried in the end supports 12 and 13 whereby the axis of rotation about which the top leaf assembly 11 swings may be shifted forwardly and rearwardly in a manner to be described more specifically in conjunction with the enlarged detailed view of FIG. 5. Each of the end supports 12 and 13 also serves to mount bending leaf 24 by means of hinges 25 and 26. Handle members 27 are provided at each hinge assembly 26 to increase the leverage during bending.

Referring now to FIGS. 1, 2, 4 and 7, an operating link arrangement is indicated by references 29 and 30 at the left- and right-hand ends of the bench brake. The operating link arrangements 29 and 30 are of uniform construction, consisting of an apertured link member 31 having a radially extending link arm 32 welded thereto.

The link arm 32 extends through an elongated opening 39 in the anvil assembly 14 and through an apertured boss 33. The aperture in the boss 33 is of oval or elliptical design with the long axis extending from front to rear of the top leaf 11. A threaded nut 34 acts against the boss 33 through nested Belleville or frusto-conical washers 35 and 36 having the smaller portion in the oval aperture. In this manner the clamping forces will remain substantially perpendicular to the surface clamped.

The upper leaf is urged upward against the washers 35 and 36 and threaded nut 34 on each of the links 32 by means of a spring 37 bottomed on the opposite end against the anvil assembly 14. The threaded nut 34 may be adjusted to vary the compression of the spring and the total clamping pressure at the nose or clamping portion of the finger members 21. A spring back up member 38 covers the elongated opening 39 which permits the link member 32 to move laterally within the anvil assembly 14 in response to angular movement of the top leaf assembly 11. A similar back up member can be provided at the opposite end of the spring 37.

The apertured link member 31 on each end of the bench brake receives shaft member 40 with a bearing fit. An eccentric end portion 41 (only one shown) formed on opposite ends of the shaft is mounted in a flanged bearing 42 bolted to the associated end support. At the right-hand end of the shaft 40, however, the eccentric end portion 41 extends through the bearing 42 a short distance to receive a collar 43 supporting a radially extending clamping handle 44.

The clamping hadle 44 serves to provide leverage permitting manual rotation of the shaft 40 about the axis defined by the geometric axis of the eccentric portions 41. The eccentric rotation of the shaft 40 within the link arrangements 29 and 30 at opposite ends of the brake 10 cause the top leaf to move downwardly aganst the force of the spring 37 to the position shown in solid lines in FIG. 4. When the handle is raised, the force developed by the spring urges the top leaf to the open position as shown in phantom lines in FIG. 4. When the handle is in the position illustrated in FIGS. 1, 2, 3 and 7, the fingers 21 are drawn into engagement with an insert bar 45 forming a part of the anvil assembly 14 to thereby clamp sheet metal stock for bending. As is well known in the art, the fingers may be spaced or of any lateral dimension to permit use in box and pan forming.

As illustrated in FIG. 4, the insert bar 45 is positioned at the junction of the two legs forming the anvil assembly therefore all clamping pressure is resisted by the vertically disposed leg portion. The angle member forming the main body of the anvil assembly may be attached to the end support members 12 and 13 by any suitable means such as welding or the like. The insert bar 45 may be joined to the upwardly facing surface of the angle 46 in a similar fashion.

Each of the top leaf hinge arms 16 and 17 is joined to the respective end supports in an identical manner and therefore description will be limited to the hinge arm 16 mounted on the left-hand end support 12. As seen in FIGS. 1, 2, and 5, the top leaf adjustable hinge assembly includes an adjustment shaft 50 having a pair of collars 51 and 52 disposed at one end within the end support member 12. An annular locking channel 53 is formed between the collars 51 and 52 and serves to provide a circumferential portion to receive the locking screw 54 shown in FIG. 3 without interfering with withdrawal of the same.

A cylindrical portion 55 is provided on the other end of the shaft 50 for reception within a bearing 56 in the hinge arm 16. The cylindrical portion 55 is formed about an axis which is offset or eccentric relative to the axis of the collars 51 and 52 so that a cam arrangement is provided having a throw of about ⅛ inch. Obviously, this is only exemplary of the one possible dimension.

A threaded bore 56 is provided within the collar 51 and receives an Allen-head screw which forms a socket for reception of an Allen-head wrench. To adjust the clearance of the top leaf at the front of the fingers 21, the locking screw 54 is released and an Allen-head wrench inserted in the socket in the Allen-head screw 57. The collars 51 and 52 may be rotated relative to the end support member 12 by rotating the wrench, causing the eccentric end 55 of the adjustment shaft 50 to move, shifting the top leaf assembly 11 rearwardly and forwardly depending upon the direction of rotation.

As noted above, the distance may be varied up to about ⅛ inch or further by modifying the total throw of the cam at manufacture. A similar cam adjustment is provided for the other hinge 17. Suitable marker means may be provided on the radial end face of the collar 51 on the shaft 50, with a co-operating index or protractor on the end face of the top leaf so that the position of the top leaf may be expediently determined and set for both ends. Any other form of index means which will facilitate ascertaining upon inspection the position of the cam may be used, as for example, marker means at the nose of the anvil assembly. In this manner, the top or clamping leaf may be set relative to the insert bar 45 to provide the proper clearance to accommodate the thickness of metal to be bent between the nose of the fingers 21 and the bending leaf 24. A better comprehension of this feature can be had after description of the manner of mounting the bending leaf 24 is given.

The bending leaf 24 has hinge members 25 and 26 fastened at opposite ends of a center leaf portion 61 by means of bolts 60. The center portion 61 of the bending leaf 24 may be provided with a hardened insert bar 62 fastened thereto by machine screws or the like. An angle bar 63 is also joined adjacent the upper edge by means of bolts 64 received in the bending leaf 61. The angle bar 63 serves as a clamp to mount forming attachments and the like as well as assisting in the bending function.

Each of the hinges 25 and 26 is of cast construction having a raised housing 65 with an opening to receive the handles 27 which may be held in place by a set screw or the like (not shown). At the top of each of the hinges as seen in FIGS. 7 and 9, is provided a transverse opening 66 to receive a hinge pin or mounting shaft 67. A set screw 68 is received in a drilled and tapped hole 69, and serves to hold the hinge pin 67 to the hinge member 25. Needle bearings 70 are also disposed in an opening 71 formed in the end wall 12 receiving the outer end of the hinge pin 67. The needle bearings will be virtually friction free and insure bending accuracy over prolonged periods of use because of their increased resistance to wear.

The foregoing completes the components in the hinge assembly on the right-hand end of the brake, however, at the left-hand end of the bending left as shown in FIG. 9, in addition to that previously described, the hinge pin 67 extends beyond the hinge support member and is provided with a stop or shoulder in the form of a radially extending cross pin 72. A stop gauge 73 is provided with an arcuately disposed elongated opening 74 extending from adjacent a stop shoulder 75 to adjacent stop shoulder 76. Between the stop shoulders 75 and 76 is an uninterrupted pie-shaped sector which permits free angular movement of the cross pin 72. The uninterrupted sector is slightly greater than 90°, being of the order of about 130° to 150°. A cap screw 77 passes through the elongated opening 74, and is received in a threaded bore (not shown) in the end support member 12 to clamp 12 to the stop gauge 73 to the end support.

In order to effect adjustment, the cap screw 77 is backed off one or two turns and the adjustment collar 73 moved angularly within the limits defined by the elongated opening 74 as shown in phantom lines in FIG. 8. Accordingly, the position of the stop shoulder 75 may be adjusted to limit the counterclockwise movement of the cross pin 72 to establish the desired angle of the bend. Once the stop gauge 73 is adjusted, the cap screw 77 is tightened and the particular angles of bend may be accurately reproduced for any number of pieces of sheet metal stock. When the stop gauge is adjusted as shown, the shoulder 76 serves to prevent the bending leaf from swinging in a clockwise direction beyond a purely vertical direction.

It is to be appreciated that the bench brake of the present invention is versatile while being compact, lightweight, easily adjusted both with respect to clamping pressure and thickness of material, and also capable of being accurate over prolonged periods of use due to the unique manner of providing suitable bearing means in what is normally the extreme points of wear. The bench brake of the present invention is particularly suited for operation by one man and may be conveniently carried and set up for operation. The unique stop gauge arrangement permits any desired angle of bend to be selected and easily repeated by merely adjusting the stop gauge to the desired angle. Notwithstanding the ease with which it may be adjusted, the stop gauge is of simplified construction and does not materially add to the over-all cost of the brake.

Upon a consideration of the foregoing it will become obvious to those skilled in the art that various modifications may be made without departing from the invention embodied herein. Accordingly, only such limitations should be imposed as are indicated in the appended claims.

I claim:

1. A bench brake comprising a pair of end support members, an anvil assembly attached to said end support members, hinge means mounting a top clamping leaf assembly at its rearward edge for pivoting movement into and out of clamping engagement with said anvil assembly, operating means to draw said top leaf assembly into engagement with said anvil assembly, said operating means including a unitary continuous clamp shaft jounaled in each of said end support members adjacent a forward part thereof for movement about a first axis, link means extending from a forward part of said top leaf to said clamp shaft, said link means being joined to said shaft for relative rotation about a second axis eccentric with respect to said first axis, means at one end of said shaft to facilitate manual rotation of the same to clamp sheet metal stock to be bent, a bending leaf supported for angular movement between said end support members with one edge thereof in close proximity to said anvil assembly, and means to adjust the limit of angular movement of said bending leaf thereby to permit adjustment of the angle of bending.

2. The bench brake of claim 1 wherein said hinge means mounting said top leaf assembly for pivoting movement into and out of clamping engagement with said anvil assembly includes hinge pin means mounted in said end supports on an axis which axis is eccentric relative to the axis of rotation of said top leaf assembly whereby rotation of said hinge pin means permits adjustment of said top leaf assembly.

3. In a bench-type brake having a top leaf assembly disposed between end support members, said top leaf assembly being adapted for angular movement into clamping engagement with an anvil assemblyy mounted between said end supports to clamp sheet metal stock to be bent, the improvement comprising supporting said top leaf assembly at a rearward part thereof between said end support members by a pair of hinge pin means, each of said hinge pin means having first and second axes which are offset relative to each other, one of said axes being disposed in said end support member and the second of said axes disposed in the hinge arm portion on said top leaf assembly, and means to clamp each of said hinge pin means in the position adjusted thereby to position said top leaf assembly relative to said anvil assembly.

4. A bench brake comprising a pair of end support members, an anvil assembly disposed therebetween and having an upwardly facing surface adapted to support sheet metal thereon, a top leaf disposed above said anvil assembly and mounted for angular movement relative thereto by hinge means at opposite ends thereof, said hinge means including hinge pin means having first and second axes which are offset relative to one another, one of said axes being rotatably disposed in said top leaf assembly, and the other of said axes rotatably disposed in said end support member whereby rotation of said hinge pin means shifts the axis of angular movement of said top leaf assembly relative to said anvil assembly, operating means to permit said top leaf to be drawn into engagement with said anvil assembly thereby to clamp sheet metal stock to be bent, said operating means including a clamp shaft having opposite end portions thereof supported in end members for movement about a first axis, link means extending from said top leaf to said shaft, said link means being connected to said shaft eccentric with respect to the first axis, means at one end of said clamp shaft to permit manual rotation of the same to draw said top leaf into engagement with sheet metal stock for clamping thereof, a bending leaf having an upper marginal edge disposed adjacent a front edge portion of said anvil assembly, said bending leaf being supported for angular movement by hinge pin means received in said end support members, one of said hinge pin means extending beyond said end support members and having means thereon to co-operate with a stop gauge carried on said end support member, and means mounting said stop gauge to permit angular adjustment relative to said shoulder thereby to permit adjustment of the angle of bending.

5. A bench brake comprising a pair of end support members, an anvil assembly attached to said end support members, and being adapted to support sheet metal for bending, hinge means mounting a top clamping leaf assembly for pivoting movement into and out of clamping engagement with sheet metal on said anvil assembly, operating means to draw said top leaf assembly into engagement with sheet metal on said anvil assembly, said operating means including a clamp shaft journaled in each of said end support members for movement about a first axis, link means extending from said top leaf to said clamp shaft, one end of said link extending through a hole of generally oval shape in said top leaf, a pair of nested frusto-conical washers having the small end thereof held in said hole by a threaded nut to permit shifting therein in response to angular movement of said top leaf, said link means having the other end thereof joined to said clamp shaft for relative rotation about a second axis eccentric with respect to said first axis, means at one end of said shaft to facilitate manual rotation of the same to clamp sheet metal stock to be bent, a bending leaf supported for angular movement between said end support members with one edge thereof in close proximity to said anvil assembly, and means to adjust the limit of angular movement of said bending leaf thereby to permit adjustment of the angle of bending.

6. A bench brake comprising a pair of end support members, an anvil assembly disposed therebetween and having an upwardly facing surface adapted to support sheet metal thereon, a top leaf disposed above said anvil assembly and mounted for angular movement relative thereto by hinge means at opposite ends thereof, said hinge means including hinge pin means having first and second axes which are offset relative to one another, one of said axes being rotatably disposed in said top leaf assembly, and the other of said axes rotatably disposed in said end support member whereby rotation of said hinge pin means shifts the axis of angular movement of said top leaf assembly relative to said anvil assembly, operating means to permit said top leaf to be drawn into engagement with said anvil assembly thereby to clamp sheet metal stock to be bent, said operating means including a clamp shaft having opposite end portions thereof supported in end members for movement about a first axis, link means extending from said top leaf to said shaft, said link means having one end connected to said clamp shaft eccentric with respect to the first axis, said link means having an opposite end extending through a generally oval aperture in said top leaf, said opposite end being held to said top leaf by a threaded nut acting through a pair of nested frusto-conical washers having the small end thereof received in said aperture to permit shifting of said link within said aperture as said top leaf moves angularly, means at one end of said clamp shaft to permit manual rotation of the same to draw said top leaf into engagement with sheet metal stock for clamping thereof, a bending leaf having an upper marginal edge disposed adjacent a front edge portion of said anvil assembly, said bending leaf being supported for angular movement by hinge pin means received in said end support members, one of said hinge pin means extending beyond said end support members and having means thereon to co-operate with a stop gauge carried on said end support member, and means mounting said stop gauge to permit angular adjustment relative to said shoulder thereby to permit adjustment of the angle of bending.

7. In a bench type brake having a cast top leaf mounted for movement about an axis into clamping engagement with sheet metal supported on an anvil assembly, the improvement comprising joining said top leaf to a clamping shaft through links at opposite ends thereof, each of said links extending through an oval aperture in said top leaf, a thread nut on a threaded portion, said link above said top leaf, and a pair of frusto-conical washers between said nut and said top leaf, said washers having the smaller end thereof in said oval aperture to align said link therewith in response to angular movement of said top leaf.

References Cited

UNITED STATES PATENTS

| | | | |
|---|---|---|---|
| 362,749 | 5/1887 | Keene | 72—319 |
| 1,283,808 | 11/1918 | Krump | 72—319 |
| 1,721,698 | 7/1929 | Krueger | 72—319 |

CHARLES W. LANHAM, *Primary Examiner.*